United States Patent Office 3,417,044
Patented Dec. 17, 1968

3,417,044
BLEND OF BUTADIENE-STYRENE BLOCK
COPOLYMER AND POLYCHLOROPRENE
Edward F. Ross and Joseph F. Svetlik, Akron, Ohio, assignors to Phillips Petroleum Company, a corporation of Delaware
No Drawing. Filed Sept. 28, 1964, Ser. No. 399,829
3 Claims. (Cl. 260—33.6)

ABSTRACT OF THE DISCLOSURE

An elastomeric composition having improved low temperature flexibility properties containing from 25 to 75 parts by weight of a solution-polymerized, butadiene-styrene block copolymer and from 75 to 25 parts by weight of neoprene rubber.

---

This invention relates to a blend of elastomers. In another aspect, this invention relates to an elastomeric composition produced by blending a solution-polymerized block butadiene-styrene rubber with a neoprene rubber.

Within recent years, various elastomeric compositions suitable for the manufacture of vehicle tires and other finished articles have appeared on the market. These elastomeric compositions range from natural rubber to various types of special rubbers which are comparatively costly. Neoprene rubbers have been found to be particularly suitable in the production of articles where excellent ozone resistance is required and where the produced article is to be subjected to severe weathering conditions. A disadvantage of the neoprene rubbers is that the neoprene polymers have relatively poor low temperature flexibility properties. To overcome these poor low temperature flexibility properties, in the compounding of neoprene rubbers expensive plasticizers such as certain esters and polyethers are employed to lower the freezing point of the compounded neoprene rubbers and thus improve the low temperature flexibilty properties of the compounded neoprene rubbers.

A further disadvantage of the neoprenes as conventionally produced is that when the compounded neoprene rubber containing the low temperature plasticizer is immersed in oil, the low temperature plasticizer is gradually leached from the neoprene and the low temperature flexibility thereby substantially reduced.

Accordingly, an object of our invention is to provide an improved elastomeric composition.

Another object of our invention is to provide an improved elastomeric composition suitable for the production of articles having good low temperature flexibility properties.

Another object of our invention is to provide a process for the production of improved elastomeric compositions comprising solution-polymerized block butadiene-styrene rubber and a neoprene rubber.

Other objects, advantages and features of our invention will be readily apparent to those skilled in the art from the following description and the appended claims.

By our invention, we have provided an improved rubbery composition of matter comprising a blend of the following: (A) from 25 to 75 parts of a block butadiene-styrene rubber prepared by solution polymerization; and (B) from 75 to 25 parts by weight, respectively, of a neoprene rubber.

Component (A) in accordance with our invention can be made by a process such as described in copending application Ser. No. 721,293 by Zelinski, filed Mar. 13, 1958. As provided in the said copending application, a mixture of conjugated diene and vinyl-substituted aromatic monomers, e.g., 1,3-butadiene and styrene, is polymerized in the presence of an organolithium compound such as alkyllithium. Other processes suitable for preparing such block copolymers are described in copending application Ser. No. 246,598 by Dollinger, filed Dec. 21, 1962, now U.S. Patent No. 3,297,793, and copending applications Ser. Nos. 300,051 (now abandoned) and 300,080 (now U.S. Patent No. 3,251,905), both by Zelinski, and both filed Aug. 5, 1959.

Polymerization of the block butadiene-styrene rubber is conducted in the presence of a hydrocarbon diluent and the resulting block copolymers are composed of two blocks, one block being a copolymer of a conjugated diene and styrene and the other block being a homopolymer of styrene. The total amount of styrene employed in the preparation of the block copolymer is in the range of 10 to 50 parts by weight per 100 parts by weight total monomers to be polymerized.

The neoprene rubbers employed as component (B) of the elastomeric composition of our invention are those produced from the polymerization of chloroprene (2-chloro-1,3-butadiene) and those copolymers produced by the polymerization of chloroprene and a constituent selected from the group consisting of styrene, isoprene, and acrylonitrile wherein the major component of the said produced copolymer is chloroprene. A chloroprene polymer can conventionally be produced by emulsifying the chloroprene in water by means of a sodium rosinate soap and polymerizing the chloroprene at 40° C. with the aid of potassium persulfate as a catalyst and in the presence of elemental sulfur as a modifier.

The elastomeric composition of our invention comprises a blend of from 25 to 75 parts by weight, preferably 50 to 75 parts by weight, of a block butadiene-styrene rubber prepared by solution polymerization, and from 75 to 25, preferably 50 to 25, parts by weight, respectively, of a neoprene rubber.

The blends of our invention can be prepared in a variety of ways, such as by mixing with mechanical mixers, such as roll mills or Banburys, either with or without plasticizers, heptizers, or other processing aids. The resultant blend can be compounded and vulcanized by well-known rubber vulcanization recipes. Alternatively, each elastomeric blend component can be compounded separately and the compounded stocks blended to give the desired ratio in the final blend.

By employing the block butadiene-styrene rubber in the inventive elastomeric composition, the low temperature plasticizer normally employed in the compounding of neoprene rubbers is not required to produce an elastomeric composition having good low temperature flexibility properties. By using a relatively inexpensive mineral oil in place of the expensive low temperature plasticizer, the compounding cost of the elastomeric composition is substantially reduced, and an elastomeric composition having physical properties nearly equivalent to the neoprene rubber employed in the blend is obtained. By, for example, compounding an elastomeric composition comprising neoprene rubber and a block butadiene-styrene solution-polymerized rubber in the weight ratio of 70 to 30, the cost of the compounded composition is reduced 25 percent when compared to the cost of the compounded neoprene.

In specific embodiments of our invention, blends were made of the solution-polymerized block butadiene-styrene rubber and a neoprene rubber. The blends were tested to determine the low temperature flexibility properties of the blends. The neoprene rubber employed in the blend was a chloroprene polymer (Neoprene W, distributed by E. I. du Pont de Nemours and Company, Wilmington, Del., and illustrated in the 1959 Catalog of Du Pont Elastomers and Chemicals). The solution-polymerized block butadiene-styrene rubber employed in the blends comprised a copolymer of 75 parts by weight 1,3-butadiene and 25 parts by weight of styrene.

The solution-polymerized block butadiene-styrene and neoprene rubbers were blended and compounded according to the following recipes illustrated in Table I.

TABLE I

| Run | Parts by weight | | | | |
|---|---|---|---|---|---|
| | 1 | 2 | 3 | 4 | 5 |
| Neoprene | 100 | 70 | 50 | 25 | |
| Block butadiene-styrene | | 30 | 50 | 75 | 100 |
| Philblack O | 40 | 40 | 40 | 40 | 40 |
| MP-black (medium thermal) | 25 | 25 | 25 | 25 | 25 |
| Zinc oxide | 5 | 5 | 5 | 5 | 5 |
| Stearic acid | 2 | 2 | 2 | 2 | 2 |
| Akroflex CD [1] | 2 | 2 | 2 | 2 | 2 |
| Circosol 2XH [2] | 25 | 25 | 25 | 25 | 25 |
| Magnesium oxide | 4 | 4 | 4 | 3 | |
| NA-22 [3] | 0.5 | 0.5 | 0.5 | 0.3 | |
| Santocure [4] | | | 1 | 1.5 | 1.7 |
| Thionex [5] | | 0.5 | 0.3 | 0.4 | 0.4 |
| Sulfur | | 1.4 | 1.7 | 1.8 | 1.9 |

[1] 65 weight percent N-phenyl-β-napthylamine, 35 weight percent N,N'-diphenyl-p-phenylenediamine.
[2] Naphthenic extender oil.
[3] 2-mercaptoimidazoline.
[4] N-cyclohexyl-2-benzothiazole sulfenamide.
[5] Tetramethylthiuram monosulfide.

The low temperature brittle point for each of the rubbers compounded in Table I was obtained by ASTM Test Method D–746 and the results are presented below in Table II.

TABLE II

| Run No. | Low temperature brittle point, °F. |
|---|---|
| 1 | −33 |
| 2 | −55 |
| 3 | −70 |
| 4 | Below −90 |
| 5 | Below −90 |

The foregoing data clearly show the improvement in low temperature flexibility of the inventive elastomeric composition employing an inexpensive extender oil (Circosol 2XH) when compared with the low temperature brittle point of neoprene.

An advantage of the inventive elastomeric blend is that when immersed in oil it will retain its low temperature flexibilty whereas a neoprene rubber containing an oil extractable plasticizer would have its plasticizer leached from the rubber by the oil, thereby substantially reducing the low temperature flexibility.

The elastomeric blend of Run No. 2 of Table II was exposed for 100 hours to air containing 100 p.p.h.m. (parts per hundred million) of ozone. The elastomeric composition of Run No. 2 showed no cracking after 100 hours. This clearly demonstrates that the inventive composition while having a substantially improved low temperature brittle point when compared to the neoprene of Run No. 1 also retains the highly desirable property of neoprene to resist ozone cracking.

As will be evident to those skilled in the art, various modifications of this invention can be made, or followed, in the light of the foregoing disclosure, without departing from the spirit or scope thereof.

We claim:

1. An elastomeric composition having improved low temperature flexibility, resistance to ozone cracking, and capability of retaining its low temperature flexibility when immersed in oil comprising (A) from 25 to 75 parts by weight of a solution-polymerized block copolymer consisting of two blocks with one block being a copolymer of 1,3-butadiene and styrene and the other block being a homopolymer of styrene, said block copolymer containing 75 parts by weight of 1,3-butadiene and 25 parts by weight of styrene, (B) from 75 to 25 parts by weight of polychloroprene or a copolymer of chloroprene and a constituent selected from the group consisting of styrene, isoprene and acrylonitrile having chlorophene in major proportions, (C) a major amount by weight of carbon black, and (D) a minor amount by weight of mineral oil.

2. The composition according to claim 1 wherein the concentration of (A) is from 50 to 75 parts by weight and the concentration of (B) is from 50 to 25 parts by weight.

3. The composition according to claim 1 wherein said mineral oil is a naphthenic extender oil.

References Cited
UNITED STATES PATENTS 3,239,478  3/1966  Harlan _____ 260—880 XR
3,265,765  8/1966  Holden et al. _____ 260—876

GEORGE F. LESMES, *Primary Examiner.*

U.S. Cl. X.R.
260—41.5, 876